United States Patent Office 2,736,727
Patented Feb. 28, 1956

2,736,727
AMINO-ETHERS

Jean Pierre Fourneau, Paris, France, assignor to Jean M. R. A. Delourme-Houde, Paris, France No Drawing. Application January 8, 1953,
Serial No. 330,355

Claims priority, application France January 24, 1952

6 Claims. (Cl. 260—247.7)

This invention relates to amino-ethers and the salts of such ethers having valuable medicinal properties.

Khellin, active principle of *Ammi visnaga*, Umbelliferae, is a medicament used by reason of its antispasmodic and coronary dilatory properties in various maladies such as angina pectoris, asthma and vesicular and ureteral spasms. Its action is more rapid and more powerful when it is administered intramuscularly than by mouth; also it is offered in two pharmaceutical forms as injectable solutions and as tablets, the injectable form being the one most used. Unfortunately, khellin is insoluble in water, so that it is necessary to dissolve it in an organic solvent such as propylene glycol. This makes the injections painful, and the solvents themselves often have a significant pharmacological action. In fact, the injectable khellin of commerce is often very badly tolerated by the patient.

Khellin is the dimethyl ether of 5,8-dihydroxy-2-methyl-4',5'-furo-6,7-chromone, and may be represented by the following formula:

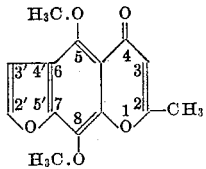

I

By demethylation of this compound, the diphenol or the corresponding quinol is obtained, the diphenolic form being illustrated by the following formula:

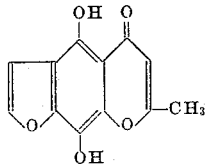

II

An object of the present invention is to provide new derivatives of the diphenol represented by Formula II, or of the corresponding quinol, which derivatives while possessing the pharmacodynamic properties of khellin, possess in the salt form a solubility in water sufficient for the derivatives to be capable of being administered in aqueous solution without the assistance of a solubilizer.

A further object of the invention is to provide such new derivatives having a lower toxicity than khellin.

A still further object of the invention is to provide a process for the preparation of these new derivatives.

According to the present invention, there is provided a new compound having valuable medicinal properties that is selected from the group consisting of an amino-ether represented by the formula:

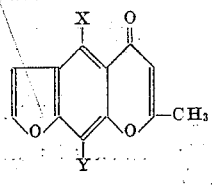

III wherein one of X and Y represents a hydroxyl group and the other represents the group:

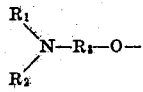

wherein

represents a group selected from a di-(lower alkyl)-amino, morpholino, and a piperidino group, and $R_3$ represents a lower alkylene group, and the water-soluble normal and quaternary ammonium salts of such amino-ether.

Salts which may be used include in particular those of hydrochloric, hydriodic and camphorsulphonic acids, while the quaternary ammonium salts which may be used include the iodomethylate.

An amino-ether according to the invention which is of particular practical importance is that in which the group

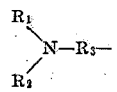

in Formula III is the β-diethylaminoethyl group. This amino-ether occurs as long pale yellow needles which melt at 98° C. after recrystallisation from petroleum ether. The hydrochloride of this base, which forms golden-yellow crystals melting at 240° C. after recrystallisation from absolute ethanol, has coronary dilatory and antispasmodic properties similar to those of khellin. Unlike khellin, it is very soluble in water and, injected as a 5% solution in distilled water intramuscularly, it has been very well tolerated by all the patients to whom it has been administered. Moreover, the toxicity of this hydrochloride is about one quarter that of khellin according to tests carried out on mice (sub-cutaneous administration). The hydriodide of this amino-ether forms golden-yellow coloured crystals melting at 204° C. after recrystallisation from absolute ethanol; the camphorsulphonate pale yellow needles melting at 123° C. after recrystallisation from acetone; and the iodomethylate yellow crystals melting at 240° C. after recrystallisation from methanol.

The new amino-ethers of the present invention may be prepared by a process which comprises reacting the appropriate tertiary amino alkyl halide, or a hydrohalide of this halide, with the quinol represented by Formula II under an inert atmosphere. The salts and the quaternary ammonium salts may be prepared from the amino-ether by the known methods for converting bases into their salts or quaternary ammonium salts.

The following non-limiting examples illustrate the present invention. For convenience, the quinol of Formula II used as starting material is called by the name khellin-quinol.

Example I

As starting material, khellin-quinol (prepared as hereinafter described) with a melting point of 280° C. is used.

In a 3-litre flask fitted with a dropping funnel, a reflux condenser and a gas inlet tube going down to the bottom of the flask and connected to a nitrogen cylinder, a mixture of khellin-quinol (27 g.) anhydrous β-diethylamino-α-chlorethane hydrochloride (22 g.) and absolute ethanol (1000 cc.) is heated to boiling under a stream of nitrogen.

From the dropping funnel, is added in small portions while maintaining the mixture boiling and the passage of nitrogen, a solution prepared in advance from sodium (5.5 g.) and absolute ethanol (250 cc.)

The boiling and the passage of nitrogen are continued for two and a half hours. Then there is added from the dropping funnel, sufficient alcoholic hydrogen chloride to acidify the mixture to Congo red (alcoholic HCl 6.48 N=9.3 cc.). The reaction mixture is once more heated to boiling (still under nitrogen) and is then filtered hot. The alcohol is distilled off under reduced pressure. The dry residue is taken up in about 400 cc. of distilled water, filtered and the base is then precipitated by an excess of sodium carbonate solution. The base is filtered, washed with water and dried in a desiccator. The crude base thus obtained (25 g.) is dissolved in 600 cc. of absolute ethanol. It is heated to boiling and slowly there is added a slight excess of alcoholic HCl (18.6 cc. of alcoholic HCl 6.48 N). Vegetable charcoal is then added to the solution, which is boiled for a few minutes and then filtered hot. The charcoal is washed with a little boiling absolute alcohol and the solution is made to crystallise by stirring and cooling under a stream of water. The crystals are filtered off, washed with a little cold absolute ethanol and dried in a desiccator. In this way 24.5 g. of golden-yellow crystals are obtained, melting at 240° C. (in a capillary tube). By concentration of the mother liquors to a small volume followed by recrystallisation from absolute alcohol, a further 1.1 g. of crystals are obtained, bringing the total yield to 25.6 g. (60% of the theoretical yield).

The khellin-quinol serving as starting material was prepared as follows. A mixture of 175 cc. of 40° Bé. nitric acid and 350 cc. of distilled water cooled under a stream of water and 50 g. of khellin is added in small portions. When all the khellin is added, it is well broken down by stirring and the mixture is placed in an ice-box. At the end of a quarter of an hour, 350 cc. of cold distilled water added. The mixture is left for half an hour in the ice-box. The insoluble material is filtered and washed 2 or 3 times with a little cold distilled water. It is then dried in a desiccator. 41 g. (93% theoretical) of crude khellin-quinol melting at 266° C. are in this way obtained.

40 g. of the crude khellin-quinol are suspended in a solution of 200 cc. of 28% sodium bisulphite in 800 cc. of distilled water. 100 cc. of concentrated hydrochloric acid is added. After triturating carefully, the mixture is placed on a boiling water bath for 1 hour to drive off the sulphur dioxide. The mixture is left to cool, and the crystals are then washed with water and dried. In this way 37 g. (yield 92%) of khellin-quinol melting at 280° C. are obtained.

*Example II*

Using a process as described in Example I, but replacing the diethylaminochlorethane by β-piperidinochlorethane, there is obtained from 5 g. of khellin-quinol 3.9 g. of β-piperidine ethyl ether of khellin-quinol. When recrystallised from a petroleum fraction boiling between 80–100° C. the base melts at 108–109° C. The hydrochloride of this base, recrystallised from absolute alcohol, melts at 243–244° C.

*Example III*

Using a process as described in Example I, but replacing the diethylamino-chloroethane by β-morpholinochlorethane, 5 g. of khellin-quinol yields 3.62 g. of the β-morpholino ethyl ester of khellin-quinol. This base, when recrystallised from a petroleum fraction boiling between 80–100° C. melts at 131–132° C. The hydrochloride of this base, recrystallised from absolute alcohol, melts at 251–252° C.

*Example IV*

Using a process as described in Example I, there is obtained from 5 g. of khellin-quinol and using β-dimethyl-aminochlorethane, 2.36 g. of the β-dimethylamino ethyl ether of khellin-quinol. This base melts at 124–125° C. after recrystallisation from a petroleum fraction boiling between 80–100° C. The hydrochloride of this base melts at 249–250° C. after recrystallisation from absolute alcohol.

All the melting points given in the examples have been taken in a capillary tube.

I claim:

1. A new compound having valuable medicinal properties selected from the group consisting of the aminoethers represented by the formula:

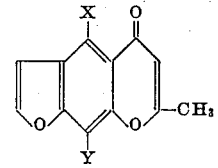

wherein one of X and Y represents a hydroxyl group and the other represents the group

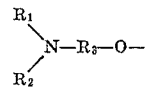

wherein

represents a member of the group selected from a di-(lower alkyl)-amino, morpholino and a piperidino group, and $R_3$ represents a lower alkylene group, and the water-soluble normal salts and quaternary ammonium salts thereof.

2. A substance selected from the group consisting of β-diethylamino ethyl ether of 5,8-dihydroxy-2-methyl-4′,5′-furo-6,7-chromone of the formula

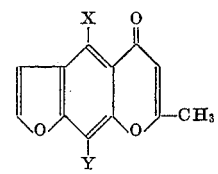

wherein one of X and Y represents a hydroxyl group and the other one represents the group

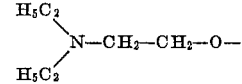

and the water-soluble normal salts and quaternary ammonium salts thereof.

3. A substance selected from the group consisting of β-piperidino ethyl ether of 5,8-dihydroxy-2-methyl-4′,5′-furo-6,7-chromone of the formula

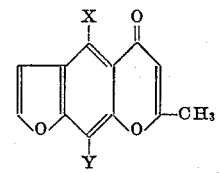

wherein one of X and Y represents a hydroxyl group and the other one represents the group

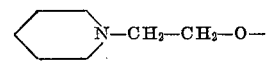

and the water-soluble normal salts and quaternary ammonium salts thereof.

4. A substance selected from the group consisting of β-morpholino ethyl ether of 5,8-dihydroxy-2-methyl-4',5'-furo-6,7-chromone of the formula

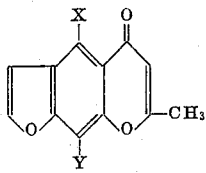

wherein one of X and Y represents a hydroxyl group and the other one represents the group

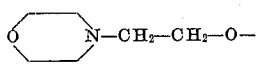

and the water-soluble normal salts and quaternary ammonium salts thereof.

5. A substance selected from the group consisting of β-dimethylamino ethyl ether of 5,8-dihydroxy-2-methyl-4',5'-furo-6,7-chromone of the formula

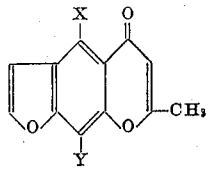

wherein one of X and Y represents a hydroxyl group and the other one represents the group

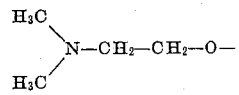

and the water-soluble normal salts and quaternary ammonium salts thereof.

6. A process for the production of a derivative of 5,8-dihydroxy-2-methyl-4',5'-furo-6,7-chromone, which comprises heating to reflux the said chromone which corresponds to the formula:

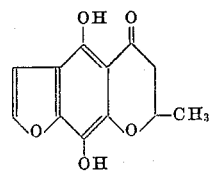

with a member of the group consisting of di-(lower-alkyl)-amino-lower alkyl halides, piperidino lower alkyl halides and morpholino lower alkyl halides in absolute ethanol in the presence of an inert atmosphere.

References Cited in the file of this patent

Abu-Shady et al.; Jour. of the Am. Pharm. Assoc., Scientific Ed., vol. 41, pp. 325–27, August 1951.